March 24, 1959
F. JOHNSON
2,878,640
SAFETY CHAIN CLAW
Filed May 13, 1957
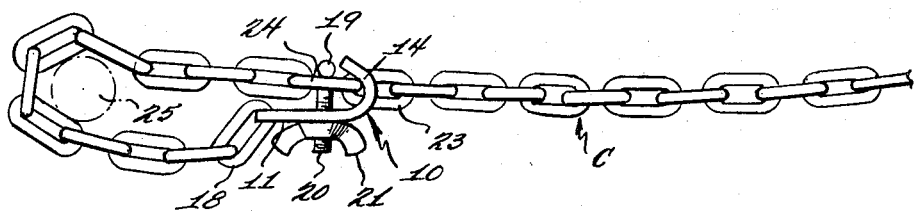
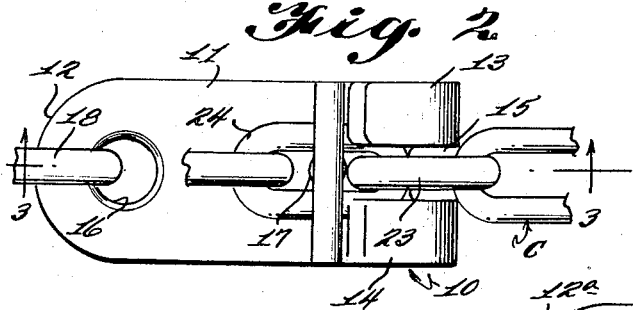
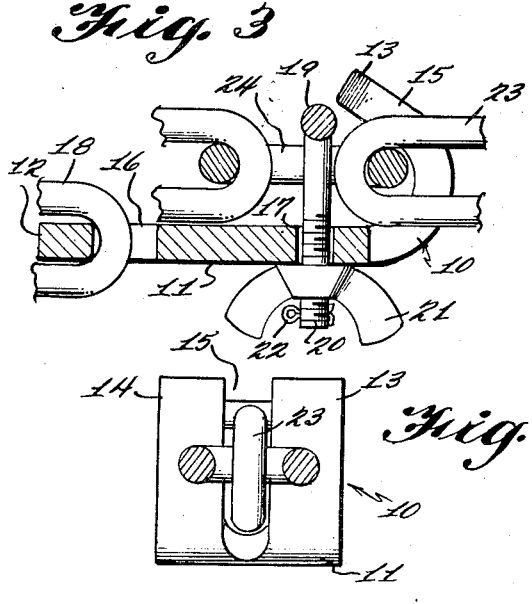
INVENTOR
FRITZ JOHNSON
BY Kimmel & Crowell
ATTORNEYS

United States Patent Office 2,878,640
Patented Mar. 24, 1959

2,878,640

SAFETY CHAIN CLAW

Fritz Johnson, Idaho Falls, Idaho

Application May 13, 1957, Serial No. 658,561

2 Claims. (Cl. 59—93)

The present invention relates to safety chain claws, and more particularly to devices for detachably securing safety chains in a looped form.

The primary object of the invention is to provide a claw for safety chains of the type used on trailers and similar equipment wherein the claw detachably secures the chain end to a point on the chain spaced from the end to form a loop in the chain.

Another object of the invention is to provide a claw for safety chains having means thereon for locking the chain into the claw against accidental dislodgment.

A still further object of the invention is to provide a claw for the end of safety chains which is inexpensive to manufacture, simple to attach and detach, and which has a strength in excess of the normal hooks formerly used for such purposes.

Other objects and advantages will become apparent in the following specification when considered in the light of the attached drawings, in which:

Figure 1 is a side elevation of the invention shown attached to a safety chain.

Figure 2 is an enlarged top plan view of the invention.

Figure 3 is a longitudinal cross-section taken along the line 3—3 of Figure 2, looking in the direction of the arrows.

Figure 4 is an end elevation of the invention with the chain shown in section.

Figure 5 is a top plan view of a modified form of the invention.

Figure 6 is a transverse cross-section taken along the line 6—6 of Figure 5, looking in the direction of the arrows.

Referring now to the drawings in detail wherein like reference numerals indicate like parts throughout the several figures, the reference character C indicates generally a safety chain of the welded link type to which the claw indicated at 10 is attached.

The claw 10 comprises a flat plate or body member 11 having a rounded end 12 and a pair of spaced arcuate hooks 13, 14 extending integrally from the opposite end in spaced relation to form a slot 15 therebetween.

The plate 11 has a bore 16 extending therethrough adjacent the rounded end 12 thereof intermediate the opposite sides thereof. A second bore 17 is formed in the plate 11 intermediate the opposite sides thereof adjacent the hooks 13, 14, as best seen in Figures 2 and 3.

The end link 18 of the chain C extends through the bore 16 to secure the claw 10 to the chain C. A T bolt 19 is provided with a threaded shank 20 which extends through the bore 17 and has a wing nut 21 threaded thereon. A cotter key 22 extends through the threaded shank 20 of the T bolt 19 to lock the wing nut 21 thereon.

A link 23 of the chain C, spaced from the end link 18, is positioned upright between the hooks 13 and 14 in the slot 15 and the link 24 secured thereto on the end thereof toward the link 18 is arranged horizontally with the shank 20 of the T bolt 19 extending therethrough to lock the links 23 and 24 in position with respect to the hooks 13 and 14 of the claw 10. In this manner the portion of the link 24 bearing against the hooks 13 and 14 is restricted from shifting to a position where it could bear against the terminal ends of the hooks 13 and 14, thus preventing the force exerted on the chain from bending the arcuate portion of the hooks 13 and 14 in such a manner as might accidentally effect the release of the chain from the claw. This is best illustrated in Figure 3. The connection of the claw 10 to the links 23, 24 of the chain C forms a loop in the end of the chain C for surrounding a bar shown in dotted lines at 25 to which the safety chain C is attached.

Referring now to Figures 5 and 6, a modified claw 10a is illustrated and includes a flat plate 11a having a rounded end 12a and a pair of hooks 13a, 14a extending integrally from the end of the plate 11a opposite the rounded end 12a. The hooks 13a, 14a are spaced apart to form a slot 15a therebetween, as best seen in Figures 5 and 6.

A bore 16a is provided in the flat plate 11a adjacent the rounded end 12a for attaching a safety chain thereto. The terminal ends 26, 27, respectively, of the hooks 13a, 14a are provided with aligned transverse bores 28, 29 through which a cotter key 30 is detachably positioned so as to lock the claw 10a onto the chain with which it is associated.

In the past, relatively complicated mechanisms have been provided for attaching safety chains from trailers to the towing vehicle either by forming loops in the ends of the chains or by directly securing the end link from the chain to the towing vehicle. Many of these devices became detached in use due to the vibration of the trailer and towing vehicle when moving over the road. The claws 10 and 10a of the instant invention can be quickly attached to a chain and will securely hold the safety chains without danger of becoming loosened while in transit.

Having thus described the preferred embodiments of the invention, it should be understood that numerous structural modifications and adaptations may be resorted to without departing from the scope of the appended claims.

What is claimed is:

1. A safety claw of the type used for securing safety chains of trailers to vehicle bumpers comprising a body member, said body member having a bore extending transversely therethrough adjacent one end thereof, a chain having the end link thereof secured through said bore, a pair of spaced arcuate hook members integrally formed on the other end of said body member engaging one of the intermediate links of said chain, said hook members extending away from said body member in an arc substantially greater than ninety degrees, said one link engaging said hook members at approximately the center of said arcuate portion, said hook members having their confronting edges in parallel relation for receipt therebetween of the link of said chain next adjacent to said one link, said body member having a bore extending transversely therethrough adjacent said other end thereof, said bore being spaced from the point of engagement of said one link and said arcuate portion a distance slightly greater than twice the cross section of the link stock of said chain, said bores and the space between said confronting edges being substantially in a single plane, a T head bolt substantially slidably fitting within said second named bore, the shank of said bolt being perpendicular to said body member and extending through said one link of said chain, said bolt having the T head thereof engaged against said one link of said chain to substantially prevent movement of said one link, and means detachably securing said bolt to said body.

2. A safety claw of the type used for securing safety chains of trailers to vehicle bumpers comprising a body member, said body member having a bore extending transversely therethrough adjacent one end thereof adapted to receive the end link of a chain therethrough, a pair of spaced arcuate hook members integrally formed on the other end of said body member for engagement with one of the intermediate links of said chain, said hook members extending away from said body member in an arc substantially greater than ninety degrees, said one link being adapted to engage said hook members at approximately the center of said arcuate portion, said hook members having their confronting edges in parallel relation for receipt therebetween of the link of said chain next adjacent to said one link, said body member having a bore extending transversely therethrough adjacent said other end thereof, said bore being spaced from the point of engagement of said one link and said arcuate portion a distance slightly greater than twice the cross section of the link stock of said chain, said bores and the space between said confronting edges being substantially in a single plane, a T head bolt substantially slidably fitting within said second named bore, the shank of said bolt being perpendicular to said body member and adapted to extend through said one link of said chain, said bolt having the T head thereof adapted to engage against said one link of said chain to substantially prevent movement of said one link, and means detachably securing said bolt to said body.

References Cited in the file of this patent

UNITED STATES PATENTS

| | | |
|---|---|---|
| 797,715 | Boyd | Aug. 22, 1905 |
| 1,179,951 | Moore | Apr. 18, 1916 |
| 1,314,832 | Roberts | Sept. 2, 1919 |
| 1,476,627 | Luebke et al. | Dec. 4, 1923 |
| 2,182,439 | Kalbfell | Dec. 5, 1939 |

FOREIGN PATENTS

| | | |
|---|---|---|
| 3,048 | Great Britain | 1915 |
| 568,615 | Great Britain | Apr. 12, 1945 |
| 521,816 | Belgium | Aug. 14, 1953 |